(12) United States Patent
Murano

(10) Patent No.: US 7,406,240 B2
(45) Date of Patent: Jul. 29, 2008

(54) PATCH PANEL FOR FIBER OPTIC NETWORK

(75) Inventor: Adam Murano, West Chesterfield, NH (US)

(73) Assignee: Ortronics, Inc., New London, CT (US)

( * ) Notice: Subject to any disclaimer, the term of this patent is extended or adjusted under 35 U.S.C. 154(b) by 525 days.

(21) Appl. No.: 11/186,721

(22) Filed: Jul. 21, 2005

(65) Prior Publication Data

US 2007/0020991 A1   Jan. 25, 2007

(51) Int. Cl.
*G02B 6/00* (2006.01)
(52) U.S. Cl. .................. 385/135; 385/134; 385/136
(58) Field of Classification Search .................. 385/135
See application file for complete search history.

(56) References Cited

U.S. PATENT DOCUMENTS

2005/0185912 A1 * 8/2005 Levesque et al. ............ 385/135

OTHER PUBLICATIONS http://www.chatsworth.com/catalog/section2/sec2pgG.asp; Literature and product information, Jun. 14, 2005, 2 pages.
Ortronics OptiMo Raised Floor Fiber Patch Panels, product literature, (no date); 2 pages.
Ortronics OptiMo Momentum modular fiber optic system, product literature, (no date), 1 page.

* cited by examiner

*Primary Examiner*—Hemang Sanghavi
*Assistant Examiner*—Kajli Prince
(74) *Attorney, Agent, or Firm*—McCarter & English, LLP

(57) ABSTRACT

The present disclosure is related to an apparatus and method that enables fiber optic network installers to mount fiber optic connections in raised floor locations that would otherwise be unsuited to the task. The method and apparatus permit using a de facto standard raised floor enclosures to accommodate fiber optic connections while maintaining bend radius considerations. In an exemplary embodiment, a patch panel includes a panel face defined by a bottom edge, a top edge and opposing side edges each joined to the bottom and top edges; a cable management bar operably coupled to the panel face, spaced apart from at least one surface side defining the panel face and extending a substantial length defining a length of the panel face; and a pair of mounting brackets extending from the opposing side edges. Each mounting bracket includes a mounting plane aligned with a plane of a corresponding angled mounted rail for mounting thereto such that the panel face is perpendicular to a bottom wall defining the enclosure in which it is mounted.

20 Claims, 2 Drawing Sheets

PATCH PANEL FOR FIBER OPTIC NETWORK

TECHNICAL FIELD

The present disclosure is directed generally to a patch panel for a fiber optic network and, more particularly, to a raised floor patch panel for use with prior art raised floor enclosure designs to accommodate fiber optic connections while maintaining a suitable bend radii of the fiber optic cables within the raised floor panel enclosure.

BACKGROUND OF THE INVENTION

It is sometimes necessary to patch communication cables within the floor or ceiling space in data centers, storage area networks (SAN) and local area networks (LAN). Patch panels and like cabinetry (e.g., enclosures) are widely employed in communication systems to facilitate such connections along various distribution paths of a network.

Floor spaces are typically low profile and fire codes require that the enclosures create isolation between the plenum air space and the cable interconnect point. This isolation, or fire stop, prevents any burning of connectivity components from making the plenum air space toxic in the event of a fire.

Raised floor enclosures typically fit under a single 2 foot×2 foot raised floor tile. Most models use the raised floor tile as a "lid". The enclosures are UL Listed enclosures, suitable for low voltage applications and for use in air handling spaces.

A variety of sizes are available to match floor height. Most models include brackets for attachment to raised floor support pedestals. Enclosures include threaded equipment mounting rails and have multiple, edge-protected cable access ports with fire-rated foam sealing kits.

In enclosures designed for use in low height floors, two facing pairs of pivoting or fixed equipment mounting rails are used to provide easy access to the front and rear of the patch panel. FIG. 1 illustrates a common raised floor enclosure 10 manufactured by American Access, which can be installed in a standard floor tile footprint. Enclosure 10 includes a 2 foot by 2 foot opening and has a depth ranging from 1.75 inches to 11 inches. For depths of 6 and 8 inches, the enclosure design of FIG. 1 is equipped with 19 inch spaced apart mounting rails 12 designed to accommodate copper terminated cable assemblies. The rails 12 are inclined at angles ranging from 45-60 degrees from the floor of the enclosure depending on the supplier. For more shallow floor depths such as 2 inch and 4 inch depths, the rails 12 are mounted such that the mounting surface is parallel with a bottom wall 14 defining the enclosure 10. It should be noted that the enclosure 10 was originally conceived when "fiber in the zone" or under floor patching of fiber optics was not popular. Therefore, the rail locations in the existing enclosures are not optimally located to accommodate suitable fiber optic bend radii. In the same vain, the designers of these existing enclosures have not accounted for any installation of cassettes (e.g., a modular fiber optic system) within these enclosures.

Therefore, there is a need for an apparatus and method that permits de facto standard raised floor enclosures to accommodate fiber optic connections, in raised floor locations, for example, while maintaining bend radius considerations. Further, there is a need for an apparatus and method that enables installation of "ready to use" modular fiber optic cassettes in de facto standard raised floor enclosures.

SUMMARY OF THE INVENTION

Exemplary embodiments of the invention include an optical fiber cable patch panel for mounting in a raised floor patch panel enclosure having angled mounted brackets. The patch panel includes a panel face, a cable management bar and a pair of mounting brackets. The panel face is defined by a bottom edge, a top edge and opposing side edges. The cable management bar extends from at least one surface side defining the panel face and extends a substantial length defining a length of the panel face. The pair of mounting brackets extend from the opposing side edges, wherein each mounting bracket includes a mounting plane aligned with a plane of a corresponding angled mounted bracket for mounting thereto such that the panel face is perpendicular to a bottom wall defining the enclosure in which it is mounted.

Further exemplary embodiments include a raised floor enclosure and patch panel assembly. The assembly includes a raised floor enclosure having two angled mounting rails spaced a predetermined distance from each other, each rail including spaced mounting openings; and a patch panel mounted to the raised floor enclosure. The patch panel includes a panel face, a cable management bar and a pair of mounting brackets. The panel face is defined by a bottom edge, a top edge and opposing side edges. The cable management bar extends from at least one surface side defining the panel face and extends a substantial length defining a length of the panel face. The pair of mounting brackets extend from the opposing side edges, wherein each mounting bracket includes a mounting plane aligned with a plane of a corresponding angled mounted bracket for mounting thereto such that the panel face is perpendicular to a bottom wall defining the enclosure in which it is mounted.

Further exemplary embodiments also include a method for mounting a patch panel for fiber optic cables in a raised floor enclosure having angled mounted rails. The method includes disposing a fiber optic cable management bar extending from at least one surface side defining a panel face, the fiber optic cable management bar extending a substantial length defining a length of the panel face, the panel face defined by a bottom edge, a top edge and opposing side edges; disposing a pair of mounting brackets extending from the opposing side edges, wherein each mounting bracket includes a mounting plane aligned with a plane of a corresponding angled mounted rail; and mounting the pair of mounting brackets to the angled mounted rails of the enclosure such that the panel face is perpendicular to a bottom defining the enclosure.

Further aspects, implementations, and advantages of the present invention will become more readily apparent from the description of the drawings and the detailed description of the preferred embodiments of the invention as provided herein below.

BRIEF DESCRIPTION OF THE DRAWINGS

So that those having ordinary skill in the art to which the disclosed invention appertains will more readily understand how to make and use the same, reference may be made to the drawings wherein.

DETAILED DESCRIPTION

Figure 1:
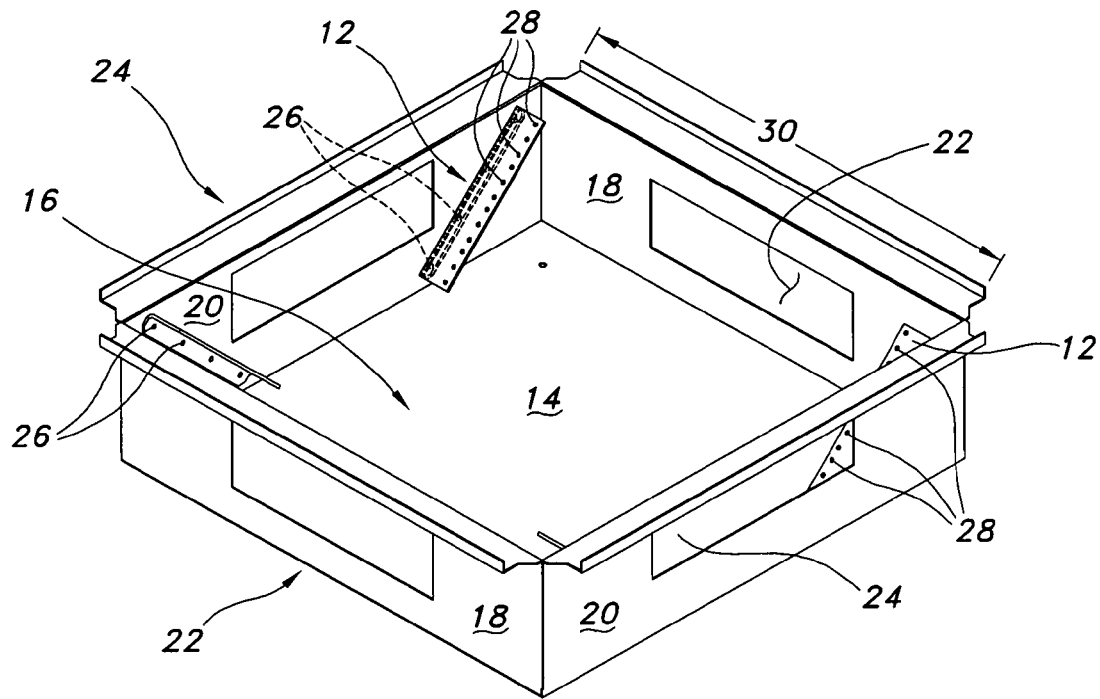
FIG. 1 is a perspective view of a prior art raised floor enclosure having two pairs of angled mounting brackets therein.

FIG. 1 illustrates a conventional raised floor enclosure 10, which can be installed in a standard floor tile footprint. In one embodiment, enclosure 10 includes a 2 foot by 2 foot opening 16 defined by two opposing trunk walls 18 and two opposing patch walls 20. Each trunk wall 18 defines a trunk opening 22, while each patch wall 20 defines a patch opening 24. The trunk wall openings 22 allow fiber optic cables into enclosure 10 for connection therein, while patch wall openings 24 allow fiber optic cables to exit enclosure 10 after connection within enclosure 10. As illustrated in FIG. 1, two pairs of mounting rails 12 are angularly or obliquely disposed (relative to bottom wall 14) on opposing patch walls 24. Rails 12 are mounted to walls 20 using fasteners 26, such as rivets or screws, for example. Each rail 12 includes a plurality of spaced apart mounting holes 28 along a length defining each rail 12. The rails 12 are inclined at angles ranging from 45-60 degrees from the floor of the enclosure depending on the supplier and spaced apart from a corresponding rail 12 with a span 30 of about 19 inches to accommodate copper terminated cable assemblies, as discussed above.

Figure 2:
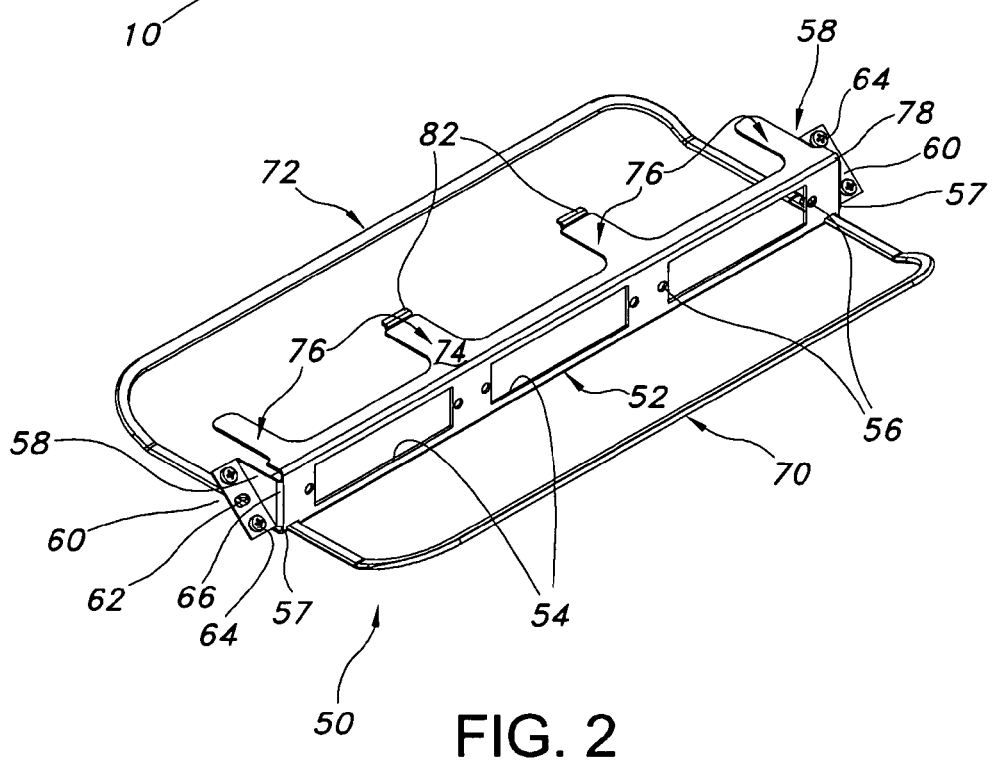
FIG. 2 is a perspective view of a 1 U raised floor patch panel for use with the enclosure of FIG. 1 in accordance with an exemplary embodiment of the present disclosure.

Referring now to FIG. 2, a patch panel 50 mountable to the enclosure 10 of FIG. 1 is illustrated, in accordance with an exemplary embodiment of the present disclosure. Patch panel 50 is a 1 unit (1 U) raised floor patch panel including a patch face 52 disposed perpendicularly relative to bottom wall 14 defining enclosure 10. Face 52 includes three serially aligned openings 54 configured to receive a corresponding cassette (not shown) or a pre-terminated cabling assembly (not shown). Either side of each opening 54 includes an aperture 56 for receiving a fastener to retain a corresponding cassette or assembly with the opening 54.

Terminal edges 57 defining opposing ends of face 52 each include a mounting flange 58 extending therefrom. Each flange 58 includes an oblique mounting plane 60. The mounting plane 60 is tilted or oblique with respect to face 52 and bottom wall 14 of enclosure 10. The mounting plane 60 is at a complementary angle with the pre-positioned mounting rails 12 to which it is mounted to in enclosure 10. Each mounting plane 60 includes at least one mounting aperture 62 in which a fastener 64 extends therethrough for mounting with a respective mounting hole 28 of a corresponding rail 12. In an exemplary embodiment, for example, fastener 64 includes a threaded fastener 64 while hole 28 is complementary threaded to threadably receive fastener 64.

The oblique mounting plane 60 allows patching face 52 to be mounted perpendicular to the bottom wall 14 of the enclosure 10. This orientation provides an installer the maximum amount of space in front of and behind panel 50 for fiber cable management. It will be recognized that panel 50 can be made to accommodate 1 U (see FIG. 2) or 2 U (see FIG. 3) designs, however the height of the panel 50 can be larger depending on the available height in the enclosure 10.

In an exemplary embodiment as illustrated in FIG. 2, each mounting flange 58 includes oblique mounting plane 60 and a plane 66 extending from plane 60. Plane 66 extends from a respective plane 60 and is substantially perpendicular to both face 52 and mounting planes 60. Each plane 66 extends from a corresponding side edge 57 defining face 52.

Still referring to FIG. 2, patch panel 50 includes two cable management bars 70, 72 disposed in front of and behind the panel face 52, respectively. The cable management bars 70, 72 each have the ability to lash or tie cables off such that they are not free to be damaged with the handling of adjacent or opposing (opposite the patching face) patch cables. The cable management bars 70, 72 are often required to support the cables and relieve stress on the terminals. The bars 70, 72 are positioned to precisely accommodate an entry and exit location (e.g., through openings 22 and 24), respectively, of the fiber optic interconnect cable and arc the fiber optic interconnect cable connected to a "ready to use" fiber optic cassette, for example (see FIGS. 3 and 4). A length of each of the bars 70, 72 is substantially equal to the length of patch panel 50.

Patch panel 50 is further equipped with a convenient labeling surface 74 for notation of ports in the patch panel 50. The labeling surface 74 is defined by a plurality of spaced apart fingers 76 extending from a top edge 78 defining face 52. Fingers 76 support a semi-rigid erasable data card 80 (see FIGS. 3 and 4). The erasable data card 80 provides a surface on which to label ports of patch panel 50. Terminal ends of the two middle fingers 76, for example, but is not limited thereto, include L-shaped flanges 82 to cooperate with complementary configured apertures 84 of data card 80. It will be recognized by one skilled in the pertinent art that each of the L-shaped flanges 82 preferably has a width less than a width of a corresponding finger 76 to prevent further translation of data card 80 along finger 76. Each L-shaped flange 82 includes a first section 86 and a second section 88. The first section extends substantially perpendicular to a surface defining a respective finger 76 while the second section 88 extends from the first section 86 substantially parallel to the surface defining the respective finger 76.

Figure 3:
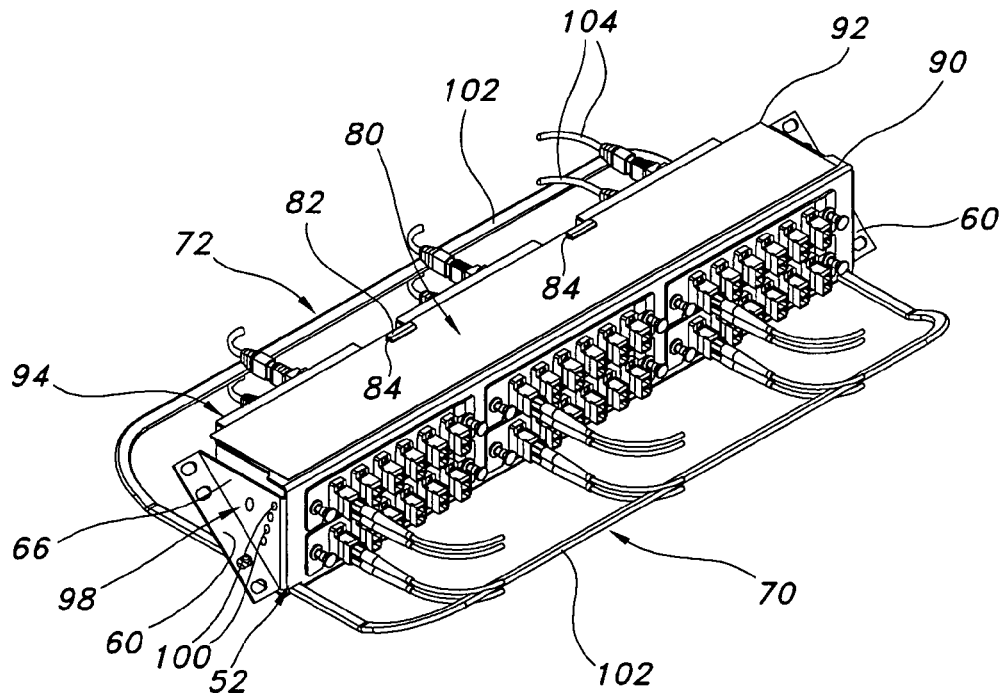
FIG. 3 is a perspective view of six cassettes installed in a 2 U raised floor patch panel having swivel mounting brackets and a data card for use with the enclosure of FIG. 1 in accordance with an exemplary embodiment of the present disclosure.
Figure 4:
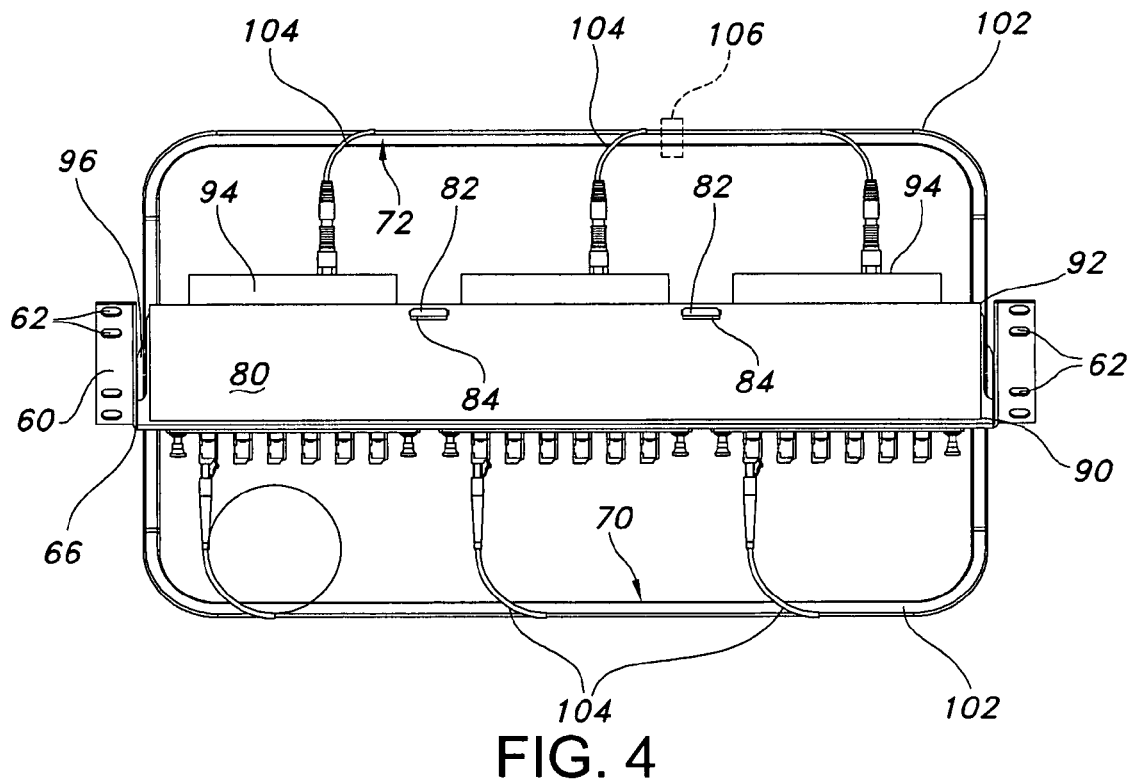
FIG. 4 is a top plan view of FIG. 3 illustrating suitable bend radii of the cables extending from the cassettes and guided out of the enclosure using a pair of opposing cable management bars of the patch panel in accordance with an exemplary embodiment of the present disclosure.

As best seen with reference to FIGS. 3 and 4, the data card 80 can be removed by first lifting a front edge 90 thereof and rotating card 80 about an opposite rear edge 92 until card 80 is substantially parallel with face 52. Then card 80 may be slid off from engagement with second section 88 of L-shaped flanges 82. Hook and loop self adhesive patches (not shown) can be strategically placed such that the card 80 will not flutter or relocate due to air movement with the cover (not shown) of enclosure 10 when open, if necessary. To access the rear of the panel 50, the data card 80 is easily removed to allow access between the fingers 76 to install or remove fiber optic connectors, such as cassettes 94 illustrated in FIGS. 3 and 4. In another embodiment of the present disclosure, the panel 50 may be attached to an extender bracket (not shown) that allows the installed panel 50 to be repositioned from the side of the enclosure 10 to allow sufficient space to install a cassette 94.

Referring now to FIG. 3, an alternative embodiment of the present disclosure is illustrated. In this embodiment of the present disclosure, the face 52 of the patching surface can be swiveled with respect to the mounting plane 60. In particular, each plane 66 is pivotally coupled to a respective plate 96 extending substantially perpendicular to face 52. Mounting plane 60 extending from plane 66 is pivotally coupled to plate 96 via pivot 98. Plane 66 also includes a plurality of apertures 100 for alignment with a corresponding aperture (not shown) defined by plate 96 for disposing a pin or screw therethrough to prevent further swiveling about pivot 98. This swiveling action allows a single patch panel 50 to accommodate multiple angles in the variety of enclosures 10 on the market. The swiveling feature has the additional effect of allowing for compensation for any errors in rail 12 orientation during the enclosure manufacturing operation. For example, if the left rail 12 were disposed at an angle of 43 degrees and the right at 48 degrees relative to wall 14 of FIG. 1, the swiveling mounting planes 60 would naturally allow compensation and location of the patch panel face 52 perpendicular to the enclosure floor or bottom wall 14.

As illustrated in FIGS. 3 and 4, each bar 70, 72 extends from a plane defining a bottom edge of face 52 and then bends upwardly toward top edge 78 of face 52. In this manner, sections 102 of each bar 70, 72 extending substantially parallel with top edge 78 are intermediate the bottom edge and top edge 78. Therefore, sections 102 are intermediate patch panel ports allowing fiber optic cables 104 extending therefrom to be coupled thereto, thus maintaining a minimum bend radius thereof. In an exemplary embodiment, fiber optic cables 104 extending from a corresponding cassette 94 (e.g., six cassettes 94 shown in a 2 U embodiment of FIGS. 3 and 4) may be secured to section 102 of a corresponding bar 72 with a hook and loop fastener 106 (shown in phantom), for example. The embodiment illustrated in FIG. 4, for example illustrates a bend radius of 1.4 inches with the placement of section 102 of bars 70, 72 relative to fiber optic cables 104 extending from cassettes 94. However, other bend radii are contemplated suitable to the desired end purpose.

The component materials of the patch panel 50 are described below for the exemplary embodiments illustrated and described with respect to FIGS. 2-4, but are not limited thereto. Face 52 and mounting flange 58 may be formed of a polymer or metal. Data card 80 is preferably made of a material that can be erased, such as polystyrene or laminated paper.

The clear advantage of the patch panel 50 as described above is to allow fiber optic patching and "ready to use" cassette systems to be used in a location that would not normally accommodate the bend radius of fiber optic cables or depth of a fiber optic cassette system. The patch panel described above may be used in enclosures having a depth as low as 1.75 inches. When examining the depth available in a de facto standard raised floor box, it is apparent that there is not sufficient space to install a mated pair of TIA-604 standardized connectors in the orientation provided. The orientation change enabled by the present disclosure allows the installer to utilize the raised floor enclosures largest dimension to allow for the industry standard bend radii of 50 mm [2 inches] for fiber optic cables having a cable diameter of less than or equal to 3 mm.

Both the patching solution and the cassette solution benefit greatly by having the ability to lash off both the cables from behind and the patch cables from the front on the integrated cable management bars. This lashing action not only provides an amount of strain relief against unexpected tugs, but it also has the benefit of creating a neater installation with the cables gracefully exiting the plenum enclosure 10. The optional variable pitch allows for the correction of any angle issues as well as an optimal fit in the enclosure.

The provision for port labeling is especially useful in today's world of frequent moves, adds and changes to a network system. Current raised floor enclosure patching systems do not have any accommodations for port labeling.

The raised floor patch panels allow data center managers and designers to take advantage of underutilized installation space beneath the raised floor structure of the data center, providing greater flexibility in structured cabling design and maximizing utility of costly data center floor space. Specifically designed for installation in raised floor boxes/enclosures that are part of the cabling pathways, the raised floor fiber patch panel described in accordance with the present disclosure addresses the special bend radius and depth requirements of fiber optic cabling systems. The unique design accommodates all installation approaches including conventional field termination techniques, pre-terminated cabling with cassette-based ribbon cabling solutions offered by the assignee of the present application and pre-terminated trunk style installations utilizing Ortronics 615 series adapter panels, patch cords and associated cable management hardware. The raised floor fiber patch panel of the present disclosure provides angled mounting brackets that result in horizontal patch panel orientation. The exemplary raised floor fiber patch panels also include removable/reusable labeling fields for enhanced convenience and accurate cabling administration and record keeping that is easily removed to provide rear patching access. Prior art panels typically use an adhesive label with informational indicia thereon that is applied to the panel. However, such labels are not easily replaced or removed. The data card of the present disclosure alleviates these issues.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. An optical fiber cable patch panel for mounting in a raised floor patch panel enclosure having angled mounted brackets, the patch panel comprising:
   a panel face defined by a bottom edge, an opposite top edge and opposing side edges each joined to the bottom and top edges;
   a cable management bar operably coupled to the panel face, the cable management bar spaced apart from at least one surface side defining the panel face and extending a substantial length defining a length of the panel face; and
   a pair of mounting brackets extending from the opposing side edges, wherein each mounting bracket includes a mounting plane aligned with a plane of a corresponding angled mounted bracket for mounting thereto such that the panel face is perpendicular to a bottom wall defining the enclosure in which it is mounted.

2. The patch panel as in claim 1, wherein the panel face includes a plurality of spaced apart fingers extending from the top edge substantially perpendicular to the panel face.

3. The patch panel as in claim 2, further comprising a data card supported on the plurality of spaced apart fingers, the data card providing an indication of a patch panel port aligned therewith.

4. The patch panel as in claim 3, wherein each terminal end of at least a plurality of the plurality of spaced apart fingers includes a locking flange to cooperatively retain the data card.

5. The patch panel as in claim 4, wherein the locking flange is an L-shaped flange configured to engage complementary configured apertures in the data card to releasably retain the data card.

6. The patch panel as in claim 1, wherein a major section of the cable management bar is spaced apart and is parallel to the length of the panel face providing a minimum bend radius for a fiber optic cable coupled thereto.

7. The patch panel as in claim 6, further comprising a second cable management bar, wherein the cable management bars, each bar disposed on opposite sides defining major surfaces of the panel face.

8. The patch panel as in claim 1, wherein each mounting bracket of the pair of mounting brackets is pivotally mounted to a side panel face via a pivot, the side panel face fixedly depending from a respective side edge defining the panel face and perpendicular thereto.

9. The patch panel as in claim 8, wherein each mounting bracket of the pair of mounting brackets includes a plurality of apertures arranged in an arc about the pivot for alignment with an aperture defined by a corresponding side panel face for disposing one of a pin and a screw therethrough to prevent further pivoting of a corresponding mounting bracket about the pivot.

10. The patch panel as in claim 9, wherein a swiveling action of each mounting bracket of the pair of brackets allows a single patch panel to accommodate multiple angles in a variety of enclosures and suitable to a variety of angled mounted brackets.

11. The patch panel as in claim 1, wherein the panel face is a 1U or a 2U panel face suitable for three cassettes or six cassettes, respectively.

12. The patch panel as in claim 1, wherein the cable management bar includes two sections extending from the bottom edge of the panel face on opposing ends thereof and slopes toward the top edge with a major section joining terminal ends of each of the two sections.

13. The patch panel as in claim 3, wherein the data card is erasable.

14. A raised floor enclosure and patch panel assembly, comprising:
   a raised floor enclosure having two angled mounting rails spaced a predetermined distance from each other, each rail including spaced mounting openings; and
   a patch panel mounted to the raised floor enclosure, the patch panel including
      a panel face defined by a bottom edge, an opposite top edge and opposing side edges each joined to the bottom and top edges;
      a cable management bar operably coupled to the panel face, the cable management bar spaced apart from at least one surface side defining the panel face and extending a substantial length defining a length of the panel face; and
      a pair of mounting brackets extending from the opposing side edges, wherein each mounting bracket includes a mounting plane aligned with a plane of a corresponding angled mounted bracket for mounting thereto such that the panel face is perpendicular to a bottom wall defining the enclosure in which it is mounted.

15. The assembly of claim 14, wherein the panel face includes a plurality of spaced apart fingers extending from the top edge substantially perpendicular to the panel face to support a data card thereon, the data card providing an indication of a patch panel port aligned therewith.

16. The assembly as in claim 15, wherein each terminal end of at least a plurality of the plurality of spaced apart fingers includes a locking flange to cooperatively retain the data card.

17. The assembly as in claim 14, wherein each mounting bracket of the pair of mounting brackets is pivotally mounted to a side panel face via a pivot, the side panel face fixedly depending from a respective side edge defining the panel face and perpendicular thereto.

18. The assembly as in claim 17, wherein each mounting bracket of the pair of mounting brackets includes a plurality of apertures arranged in an arc about the pivot for alignment with an aperture defined by a corresponding side panel face for disposing one of a pin and a screw therethrough to prevent further pivoting of a corresponding mounting bracket about the pivot.

19. A method of mounting a patch panel for fiber optic cables in a raised floor enclosure having angled mounted rails, the method comprising:
   disposing a fiber optic cable management bar spaced apart from at least one surface side defining a panel face, the fiber optic cable management bar extending a substantial length defining a length of the panel face, the panel face defined by a bottom edge, an opposite top edge and opposing side edges;
   disposing a pair of mounting brackets extending from the opposing side edges, wherein each mounting bracket includes a mounting plane aligned with a plane of a corresponding angled mounted rail; and
   mounting the pair of mounting brackets to the angled mounted rails of the enclosure such that the panel face is perpendicular to a bottom defining the enclosure.

20. The method of claim 19, wherein the pair of mounting brackets have spaced mounting openings aligned with spaced mounting openings defined in the angled mounted rails.

* * * * *